United States Patent
Larson et al.

(10) Patent No.: US 12,297,134 B2
(45) Date of Patent: May 13, 2025

(54) SYSTEM AND METHOD FOR ATTACHED GROWTH BIOLOGICAL TREATMENT AND ACTIVATED CARBON TREATMENT OF A WASTEWATER STREAM

(71) Applicant: LUMMUS TECHNOLOGY LLC, Houston, TX (US)

(72) Inventors: Simon Larson, Wausau, WI (US); Eric Martin, Tomahawk, WI (US)

(73) Assignee: LUMMUS TECHNOLOGY LLC, Houston, TX (US)

( * ) Notice: Subject to any disclaimer, the term of this patent is extended or adjusted under 35 U.S.C. 154(b) by 48 days.

(21) Appl. No.: 17/265,997

(22) PCT Filed: Aug. 6, 2019

(86) PCT No.: PCT/US2019/045273
§ 371 (c)(1),
(2) Date: Feb. 4, 2021

(87) PCT Pub. No.: WO2020/036770
PCT Pub. Date: Feb. 20, 2020

(65) Prior Publication Data
US 2021/0163328 A1    Jun. 3, 2021

Related U.S. Application Data

(60) Provisional application No. 62/718,603, filed on Aug. 14, 2018.

(51) Int. Cl.
*C02F 9/00*    (2023.01)
*C02F 1/28*    (2023.01)
(Continued)

(52) U.S. Cl.
CPC ............... *C02F 9/00* (2013.01); *C02F 1/283* (2013.01); *C02F 1/44* (2013.01); *C02F 3/108* (2013.01);
(Continued)

(58) Field of Classification Search
CPC ...... C02F 9/00; C02F 1/24; C02F 1/44; C02F 1/283; C02F 1/444; C02F 3/06;
(Continued)

(56) References Cited

U.S. PATENT DOCUMENTS 4,407,717 A * 10/1983 Teletzke .................... C02F 3/06
210/201
4,983,299 A * 1/1991 Lupton ...................... C02F 3/10
210/150
(Continued)

FOREIGN PATENT DOCUMENTS

CN    105621780 A    6/2016
IL    107201 A * 6/1999 ............... C02F 3/02
(Continued)

OTHER PUBLICATIONS

PCT International Search Report and Written Opinion of the International Searching Authority mailed Nov. 21, 2019 corresponding to PCT Application No. PCT/US2019/045273 filed Aug. 6, 2019.
(Continued)

*Primary Examiner* — Chester T Barry
(74) *Attorney, Agent, or Firm* — Calfee, Halter & Griswold LLP

(57) ABSTRACT

A process for treating a wastewater stream includes delivering a wastewater stream to an attached growth reactor to provide an amount of activated carbon and an attached growth support media having active biological material thereon within the attached growth reactor. The method also includes contacting the wastewater stream with attached
(Continued)

growth support media and the activated carbon with the attached growth reactor to reduce an amount of biodegradable and adsorbable contaminants in the wastewater stream.

10 Claims, 1 Drawing Sheet

(51) Int. Cl.
  *C02F 1/44* (2023.01)
  *C02F 3/10* (2023.01)
  *C02F 11/08* (2006.01)
  *C02F 101/10* (2006.01)
  *C02F 101/30* (2006.01)

(52) U.S. Cl.
  CPC .......... *C02F 11/08* (2013.01); *C02F 2101/10* (2013.01); *C02F 2101/30* (2013.01); *C02F 2303/16* (2013.01)

(58) Field of Classification Search
  CPC .. C02F 3/08; C02F 3/108; C02F 11/08; C02F 2101/10; C02F 2101/30; C02F 2303/16; C02F 2001/007; C02F 2301/046; Y02W 10/10
  See application file for complete search history.

(56) References Cited

U.S. PATENT DOCUMENTS

| | | | |
|---|---|---|---|
| 5,403,487 A * | 4/1995 | Lodaya | C02F 3/06 210/903 |
| 5,980,738 A * | 11/1999 | Heitkamp | C02F 3/06 210/150 |
| 6,395,522 B1 | 5/2002 | DeFilippi et al. | |
| 8,398,856 B2 * | 3/2013 | Chaudhuri | C02F 3/345 210/615 |
| 2007/0209999 A1 | 9/2007 | Smith et al. | |
| 2014/0083941 A1 * | 3/2014 | Le Tallec | C02F 3/10 210/150 |
| 2019/0023593 A1 | 1/2019 | Gonzalez Ospina et al. | |

FOREIGN PATENT DOCUMENTS

| | | |
|---|---|---|
| WO | 9322245 A1 | 11/1993 |
| WO | 2018022403 A2 | 2/2018 |
| WO | 2018044679 A1 | 3/2018 |

OTHER PUBLICATIONS

R. Abdul-Rahman et al: "Performance of Dual-Media Expanded Bed Bioreactor", Dev. Ch em. Eng. Mineral Process. 13(5/6), May 15, 2008 (May 15, 2008), pp. 645-654, XP055639509.

Lewandowski et al., "Biofilms in Water and Wastewater Treatment," In: Peter Wilderer (ed.) Treatise on Water Science, Oxford: Academic Press., 2011, vol. 4, pp. 529-570.

United States Environmental Protection Agency, "Trickling Filters," Waste Water Technology Fact Sheet EPA 832-F-00-014, Sep. 2000, 7 pp.

* cited by examiner

SYSTEM AND METHOD FOR ATTACHED GROWTH BIOLOGICAL TREATMENT AND ACTIVATED CARBON TREATMENT OF A WASTEWATER STREAM

FIELD

This invention relates to treatment processes and systems, and in particular to processes and systems for activated carbon and attached growth biological treatment of contaminants in a wastewater stream.

BACKGROUND

Waste streams are commonly treated by a wide variety of solutions in order to remove organics, solids, and any other undesirable contaminants therefrom. For one, biological treatment of wastewater is widely practiced, wherein the wastewater is treated with waste activated sludge within a treatment tank (bioreactor). Oftentimes, waste streams comprise a mixture of contaminants, e.g., chemical oxygen demand (COD)—some of which are at least slowly biodegradable and treatable with biological material and others referred to as recalcitrant (non-biodegradable) COD which do not readily biodegrade and are instead typically treated with an activated carbon material. The activated carbon is typically in the form of a granulated activated carbon (GAC) or a finer powdered activated carbon (PAC).

Conventional wisdom in the art is that activated carbon should not be added directly to a bioreactor designed for attached growth treatment. By its nature, attached growth biological treatment relies upon the build up of a film of biological material on a surface of a media which then contacts the wastewater stream to digest the biodegradable contaminants. The conventional thought is that, given its abrasiveness at high concentrations (e.g., >0.5:1 carbon to biological material ratio), the addition of activated carbon to an attached growth bioreactor would quickly result in the erosion of the biofilm and then degradation of the underlying media, thus limiting its efficiency and effectiveness in treating a wastewater stream. For this reason, a wastewater stream comprising both biodegradable and adsorbable contaminants is generally first delivered to a bioreactor comprising the biological material to reduce biodegradable contaminants followed by treatment in a separate tank containing powdered activated carbon (PAC) or a column containing granular activated carbon (GAC) for removal of the remaining biodegradable contaminants and adsorbable contaminants. This arrangement results in a relatively large footprint, as well as high material and operational costs. In addition, conventional wisdom was to separate the biological material from the activated carbon since it was believed that the activated carbon and the biological material would coalesce when present together. In turn, it was believed this coalescence would result in a loss of oxygen to the biological material, and thus loss of performance.

SUMMARY

In accordance with an aspect, the present inventors have surprisingly found that a wastewater comprising both biodegradable and adsorbable contaminants therein may be successfully treated to below standard allowable limits with an activated carbon and attached growth biological treatment system and process. Surprisingly, the inventors have found that a biological growth was able to be maintained on the attached growth media notwithstanding the presence of the activated carbon in the bioreactor. In fact, the inventors found that the activated carbon is actually capable of being maintained on the attached growth media along with a desirable build up of the biological media on the attached growth media. The systems and processes described herein thus eliminate the need for separate activated carbon and attached growth bioreactor components, thereby providing significant footprint, material, and operational savings. Further, the systems and processes allow for less biological solids generation and reduced wasting needs.

In accordance with an aspect of the present invention, there is provided a process for treating a wastewater stream comprising an amount of biodegradable and adsorbable contaminants therein. The process comprises delivering the wastewater stream to an attached growth reactor comprising an amount of activated carbon and an attached growth support media having active biological material thereon; and contacting the wastewater with attached growth support media and the powdered activated carbon under conditions to reduce an amount of the biodegradable and adsorbable contaminants in the wastewater.

In accordance with another aspect of the present invention, there is provided a system for treating a wastewater stream comprising an amount of biodegradable and adsorbable contaminants therein, the system comprising a source of the wastewater and an attached growth reactor in fluid communication with the source, the attached growth reactor comprising an amount of activated carbon and an attached growth support media having active biological material thereon.

BRIEF DESCRIPTION OF THE DRAWINGS

The invention is explained in the following description in view of the drawings that show.

DETAILED DESCRIPTION

Figure 1:
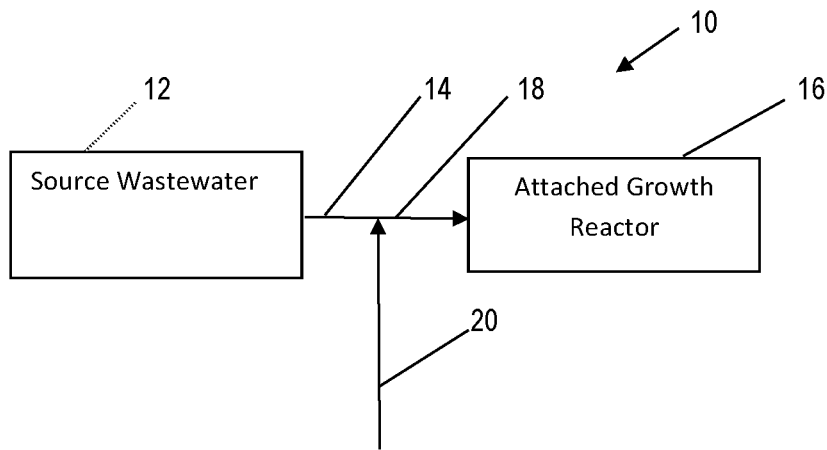
FIG. 1 is a schematic illustration of a system in accordance with an aspect of the present invention.

Referring now to the drawings, FIG. 1 illustrates a first embodiment of a treatment system 10 in accordance with an aspect of the present invention. The system 10 comprises a source 12 of a wastewater stream 14 in fluid communication with an attached growth reactor 16 via a fluid line 18. As used herein, by "fluid communication," it is meant that a fluid may flow from one component to another component. The wastewater stream 14 may comprise any fluid comprising an amount of biodegradable and adsorbable contaminants to be treated by the systems and processes described herein. The biodegradable and adsorbable contaminants comprise any undesirable compounds which are capable of being digested by biological material. In addition, the wastewater stream 14 comprises any contaminants capable of being adsorbed by activated carbon. Thus, by "adsorbable contaminants," it is meant a chemical species, compound, or the like, which is capable of being adsorbed by an activated carbon material.

In an embodiment, the biodegradable and adsorbable contaminants an amount of biodegradable chemical oxygen demand (COD) therein and also an amount of recalcitrant COD therein. By "biodegradable," it is meant that the stream 14 comprises a COD concentration therein which is capable of being reduced by an amount of biological material. As used herein, the term "recalcitrant" defines a class of compounds which may be slower to biodegrade relative to the biodegradable COD or otherwise not biodegradable. Examples of recalcitrant organics include synthetic and natural organic chemicals. Other recalcitrant organics include polychlorinated biphenyls, polycyclic aromatic hydrocarbons, polychlorinated dibenzo-p-dioxin, and polychlorinated dibenzofurans. Endocrine disrupting compounds are also a class of recalcitrant organics which can affect hormone systems in organisms, and are found in the environment.

The attached growth reactor 16 comprises a suitable housing of a material, size, and shape suitable for its intended operation. When the wastewater stream 12 is delivered or otherwise provided within the attached growth reactor 16, the attached growth reactor 16 comprises an attached growth support media comprising an amount of biological material thereon and an amount of activated carbon. Generally, the biological material on the attached growth support media will work to reduce an amount of the biodegradable material in the wastewater stream 14 while the activated carbon will adsorb otherwise difficult to biodegrade or non-biodegradable material.

The wastewater stream 14 may be contacted with the activated carbon and the biological material for a time suitable to provide a desired reduction of biodegradable and adsorbable contaminants in the wastewater stream 14. In certain embodiments, the activated carbon may be introduced directly into the attached growth reactor 16. In other embodiments, the activated carbon may be introduced into the fluid line 18 extending between the source 12 of the wastewater stream 14 and the attached growth reactor 16 as is shown by arrow 20 in FIG. 1. In this way, an amount of the activated carbon is combined with the wastewater stream 12 upstream from the attached growth reactor 16, and a feed comprising the activated carbon and wastewater stream 12 may be delivered to the attached growth reactor 16.

The attached growth support media in the reactor 16 may comprise any suitable media suitable for retaining and growing an amount of microorganisms thereon. In addition, the attached growth support media may be provided in any suitable form and be of any suitable inert material, such as a synthetic polymeric material. For example, the attached growth support media may comprise attached growth support media comprises a member selected from the group consisting of high-density polyethylene (HDPE), polypropylene, polyethylene, and combinations thereof. In a particular embodiment, the attached growth support media comprise a high-density polyethylene (HDPE) material.

It is appreciated that the biological material is contacted with the attached growth support media under conditions and for a duration effective to generate a film of biological material on a surface of the media. The attached growth support media and the contact of the stream 12 therewith may be provided in any suitable configuration. In an embodiment, the attached growth reactor is configured as a submerged attached growth reactor (SAGR), a moving media attached growth reactor (MMAGR), a stationary media attached growth reactor (SMAGR), a moving bed biofilm reactor (MBBR), or a submerged fixed bed biofilm reactor (SFBBR) as are known in the art.

The biological material (or population) may include any suitable population of microorganisms effective to reduce an amount of biodegradable compounds in the wastewater stream 12. In addition, the microorganisms may comprise any bacteria or combination of bacteria suitable to thrive in anoxic and/or aerobic conditions. Representative microorganisms for use herein may be from one or more of the following bacteria families: *Acetobacteraceae, Acidobacteriaceae, Aeromonadaceae, Alcaligenaceae, Alteromonadaceae, Anaerolineaceae, Aurantimonadaceae, Bacillaceae, Bacteroidaceae, Beijerinckiaceae, Bradyrhizobiaceae, Brevibacteriaceae, Brucellaceae, Burkholderiaceae, Burkholderiales, Campylobacteraceae, Caulobacteraceae, Chitinophagaceae, Chromatiaceae, Chromobacteriaceae, Chroococcales, Clostridiaceae, Clostridiales,* Clostridiales Family XI. *Incertae Sedis,* Clostridiales Family XIII. *Incertae Sedis, Comamonadaceae, Cryomorphaceae, Cytophagaceae, Desulfobacteraceae, Desulfobulbaceae, Desulfomicrobiaceae, Ectothiorhodospiraceae, Enterobacteriaceae, Erysipelotrichaceae, Erythrobacteraceae, Flavobacteriaceae, Gammaproteobacteria, Hydrogenophilaceae, Hyphomicrobiaceae, Legionellaceae, Methylobacteriaceae, Methylococcaceae, Methylocystaceae, Methylophilaceae, Microbacteriaceae, Micrococcineae, Moraxellaceae, Mycobacteriaceae, Nitrosomonadaceae, Nostocaceae, Oxalobacteraceae, Peptostreptococcaceae, Phycisphaeraceae, Phyllobacteriaceae, Planctomycetaceae, Porphyromonadaceae, Pseudoalteromonadaceae, Pseudomonadaceae, Rhizobiaceae, Rhizobiales, Rhodobacteraceae, Rhodobiaceae, Rhodocyclaceae, Rhodospirillaceae, Rhodospirillales, Rickettsiales, Rikenellaceae, Ruminococcaceae, Saprospiraceae, Shewanellaceae, Sinobacteraceae, Sphingobacteriaceae, Sphingomonadaceae, Staphylococcaceae, Synergistaceae, Thioalkalispiraceae, Verrucomicrobiaceae, Vibrionaceae, Xanthobacteraceae,* and *Xanthomonadaceae.*

Generally, the activated carbon may comprise any suitable carbon material suitable for the adsorption of desired contaminants, namely recalcitrant organics, from the wastewater stream 12. In an embodiment, the activated carbon comprises a granulated activated carbon material or a powdered activated carbon as are known in the art. In a particular embodiment, the activated carbon comprises a powdered activated carbon material. The activated carbon and the biological material may be provided in a suitable ratio relative to one another for the targeted contaminants. In a particular embodiment, the ratio of activated carbon to biological material is from 0.5:1 to 25:1 by weight.

Figure 2:
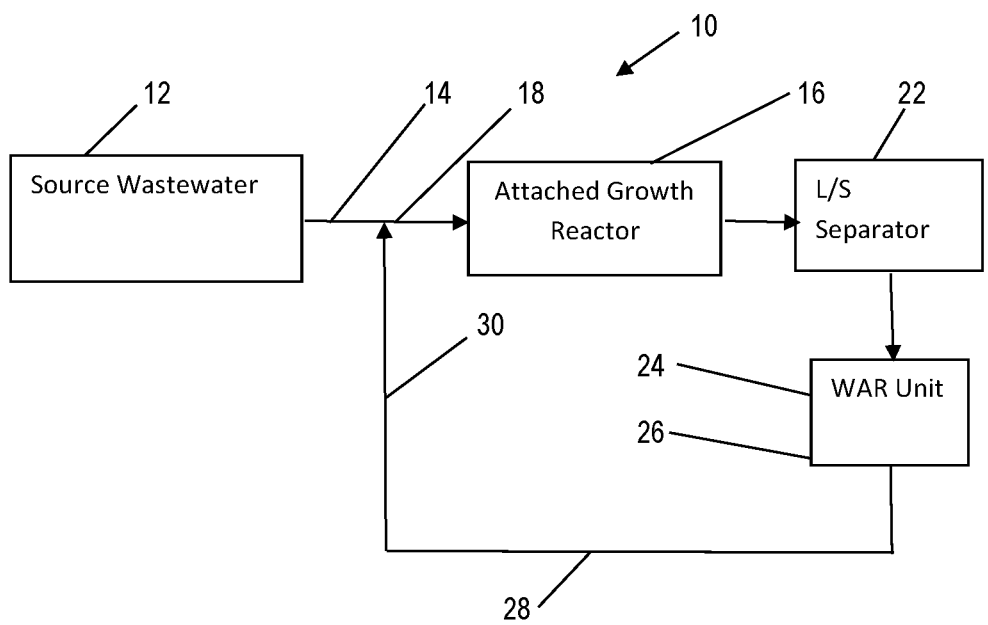
FIG. 2 comprises a schematic illustration of another system in accordance with an aspect of the present invention.

In certain embodiments and as shown in FIG. 2, an effluent from the attached growth reactor 16 may be delivered to a liquid/solid separator 22 to separate the effluent into a liquid portion and a solids portion, wherein the solids portion comprises an amount of spent carbon and biological material. In an embodiment, the liquid/solid separator 22 comprises a membrane unit comprising a plurality of membranes therein. The membrane unit may comprise one or more porous or semipermeable membranes (also referred to as "membrane(s)" or "membrane" for ease of reference). In an embodiment, the membrane comprises a microfiltration membrane or an ultrafiltration membrane as is known in the art. In addition, the membrane may have any configuration suitable for its intended application, such as a sheet or hollow fibers. Further, the membrane has a suitable porosity and/or permeability for its intended application. Still further, the membrane may have any suitable shape and cross sectional area such as, for example, a square, rectangular, or cylindrical shape. In one embodiment, the membrane has a rectangular shape.

Within the membrane unit, the one or more membranes may be positioned, e.g., vertically, in a treatment zone of the membrane unit in such a way as to be completely submerged by material within the unit therein during operation. In certain embodiments, the membrane unit may include a blower or the like for supplying a gas to scour the membrane(s) and prevent solids build up on a surface of the membrane(s) therein. Each blower may produce fine bubbles, coarse bubbles, a jet stream of gas, a jet of gas and fluid, and combinations thereof. Typically also, a pump (not shown) may be provided to generate a suitable suction force to draw fluid through each membrane of the membrane unit to generate a retentate and a filtrate. In certain embodiments, the membrane unit may also comprise an amount of powdered activated carbon therein for further polishing/treating the filtrate to reduce any remaining contaminants therein. In other embodiments, the liquid/solid separator 22 may comprises one or more clarifiers, dissolved gas flotation units, or any other device or system for carrying out the separation.

Regardless of the structure or process used, the liquid/solid separator 22 provides a liquid portion (with a reduced amount of biodegradable and adsorbable contaminants relative to the waste stream) and a solids portion which comprises an amount of spent carbon and biological solids. From the liquid/solid separator, the liquid portion may be directed to storage, transport, discharge, reinjection, irrigation, reuse, or the like. In an embodiment, the liquid portion comprises a COD concentration below a predetermined level prior to discharge. In certain embodiments, the predetermined level is 30 mg/L or a greater amount (160, 150, 125, 100, 75, 60, 50, or 40 mg/L). In certain embodiments, the solids portion comprises spent carbon (wherein at least a portion of the spent carbon comprises activated carbon comprising adsorbed material thereon) and biological material. The solids portion is in fluid communication with a carbon regeneration unit 24 as shown in FIG. 2 for delivery of the solids portion thereto. At the carbon regeneration unit 24, the solids portion undergoes oxidation of any oxidizable materials therein and regeneration of the spent carbon material therein. In this way, waste is avoided and the activated carbon/biological material may be recycled for treatment of further incoming wastewater.

In an embodiment, the regeneration unit 24 comprises a wet air regeneration (WAR) unit 26 having an input in fluid connection with an output of the liquid/solid separator 22. The WAR unit 26 may comprise one or more dedicated reactor vessels in which oxidation and/or regeneration of the spent activated carbon portion takes place. The regeneration process therein typically involves treatment of the incoming feed with an oxidant, generally molecular oxygen from an oxygen-containing gas, at elevated temperatures and pressures. In an embodiment, the regeneration of the spent carbon is done at a pressure from about 20 atm to about 240 atm and at a temperature from about 150° C. to about 373° C. with the addition of oxygen to the feed stream or the WAR unit 26. In an embodiment, sufficient oxygen is provided to the unit to provide an offgas having an oxygen concentration of at least 3 vol. %, and in a particular embodiment from 5-15 vol. % oxygen. In a particular embodiment, the wet air regeneration is carried out at a temperature of about 200° C. or less, and in a particular embodiment from about 150° C. to about 200° C. for a duration of at least about 1 hour, and in a particular embodiment from about 3 to 8 hours.

The wet air regeneration of carbon destroys the volatile portion of the biological solids and oxidizes and/or changes the organic substances adsorbed on the activated carbon to restore its adsorptive capacity, and results in a regenerated slurry. The regenerated slurry (shown as 28) from the wet air regeneration process consists primarily of reactivated carbon particles and oxidized biological solids. In certain embodiments, the regenerated slurry 28 comprises inorganic ash particles removed from the wastewater by the carbon and formed during the regeneration process. The ash may be further separated from the regenerated slurry by known separation methods such as those reported in U.S. Pat. Nos. 4,778,598 and 4,749,492, both of which are incorporated herein by reference in their entireties for all purposes. In any case, the regenerated slurry 28 may be directed to back to the attached growth reactor 16 or to the fluid line 18 between the wastewater source 12 and the attached growth reactor 16 via line 30 to provide the necessary activated carbon for subsequent treatment of stream 12. In certain embodiments, fresh activated carbon or biological material may be introduced to the line 18 or attached growth reactor 16 in lieu of or in addition to the regenerated material.

The function and advantages of these and other embodiments of the present invention will be more fully understood from the following examples. These examples are intended to be illustrative in nature and are not considered to be limiting the scope of the invention.

EXAMPLE

Below is data generated during bench-scale studies performed on refinery de-oiled wastewater using conventional activated sludge (CAS) and the PACT® AG process with two plastic carrier media types.

TABLE 1

| CAS vs PACT AG Pre & Post PAC addition | | | |
|---|---|---|---|
| | CAS (Effluent DOC, mg/L) | Media 1 (Effluent DOC, mg/L) | Media 2 (Effluent DOC, mg/L) |
| PRE PAC | | | |
| Mar. 1, 2018 | 73.80 | 75.00 | 80.30 |
| Mar. 6, 2018 | 71.50 | 78.10 | 79.90 |
| Mar. 8, 2018 | 72.4 | 77.8 | 80 |
| Mar. 13, 2018 | 76.2 | 79.4 | 80.6 |
| Mar. 15, 2018 | 74.6 | 81.1 | 81.5 |
| Mar. 20, 2018 | 73.9 | 80.3 | 79.5 |
| Mar. 22, 2018 | 74.3 | 79.4 | 80.5 |
| Mar. 27, 2018 | 76.8 | 81 | 77.4 |
| Mar. 30, 2018 | 73.2 | 79.4 | 76.3 |
| Apr. 3, 2018 | 76.5 | 78.8 | 78.3 |
| POST PAC | | | |
| Apr. 5, 2018 | 77.7 | 69.2 | 65.7 |
| Apr. 10, 2018 | 74.8 | 69.0 | 71.5 |
| Apr. 12, 2018 | 67.1 | 64.6 | 69.3 |
| Apr. 17, 2018 | 70.1 | 60.6 | 59.2 |
| Apr. 19, 2018 | 74.5 | 58.9 | 58.6 |
| Apr. 24, 2018 | 73.4 | 38.5 | 40.4 |
| Apr. 26, 2018 | 70.5 | 39.5 | 43.5 |

Bench-scale testing was performed using a total of six bioreactors resulting in three controls and three test units. One sequencing batch reactor (SBR) representing conventional activated sludge (CAS) treatment as the control, one SBR representing a conventional PACT® treatment system to gauge PAC efficiency and four continuous flow reactors (CFRs) with equivalent amounts ($m^2$ of media surface are per $m^3$ of treated wastewater to yield equal surface area loading rates (SALR) of biofilm carrier media as the attached growth control as well as the two test reactors. The six reactors were allowed to acclimate and stabilize prior to PAC addition. Post acclimation, a PAC plus water slurry equivalent to a "typical" carbon dose was added four times daily directly to the PAC bioreactors.

Treatment performance was monitored by performing laboratory analytical testing on reactor effluent samples. Critical performance indicators were chemical oxygen demand (COD), soluble total organic carbon (sTOC), biochemical oxygen demand ($BOD_5$), ammonium ($NH_4$) and phosphate ($PO_4$). Key process variables, namely dissolved organic carbon (DOC), pH, and temperature were also monitored and recorded.

Post-PAC addition, the DOC (Table 1) was used as the metric to gauge treatment performance. The post PAC results for the attached growth (AG) reactors were used to demonstrate the increase in treatment performance when compared to the CAS reactor, as well as the performance against the PACT® control. Treated effluent sTOC results indicated that attached growth treatment of the de-oiled refinery wastewater was enhanced when compared to CAS and comparable to the conventional PACT® system effluent. These results indicate that the attached growth biofilm in the presence of PAC is capable of metabolizing organic contaminants the same as that typically seen in a suspended growth treatment system. This will allow the attached growth biofilm to realize the symbiotic benefits of a PAC plus biomass system.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A process for treating a wastewater stream comprising:
    delivering the wastewater stream to a submerged fixed bed biofilm reactor to provide an amount of activated carbon and an attached growth support media having active biological material thereon within the submerged fixed bed biofilm reactor;
    contacting the active biological material with the attached growth support media to generate a film of active biological material on a surface of the attached growth support media;
    contacting the wastewater stream with the attached growth support media and the activated carbon within the submerged fixed bed biofilm reactor to reduce an amount of biodegradable and adsorbable contaminants in the wastewater stream, wherein a ratio of activated carbon to biological material is from 0.5:1 to 25:1 by weight; and
    delivering an effluent from the submerged fixed bed biofilm reactor to a liquid/solid separator for separating the effluent into a liquid portion and a solids portion, wherein the solids portion comprises an amount of spent carbon and biological material.

2. The process of claim 1, wherein an amount of the powdered activated carbon is combined with the wastewater upstream from the submerged fixed bed biofilm reactor, and wherein a feed comprising the activated carbon and the wastewater stream is delivered to the submerged fixed bed biofilm reactor.

3. The process of claim 1, wherein the liquid/solid separator comprises at least one of a membrane unit comprising a plurality of membranes and activated carbon therein, a clarifier, or a dissolved gas flotation unit.

4. The process of claim 1, further comprising regenerating the spent carbon and delivering the regenerated spent carbon to the submerged fixed bed biofilm reactor or the wastewater stream.

5. The process of claim 1, wherein the attached growth support media comprises high-density polyethylene (HDPE), polypropylene, polyethylene, or a combination thereof.

6. A process for treating a wastewater stream comprising:
    delivering the wastewater stream to a submerged fixed bed biofilm reactor to provide an amount of activated carbon and an attached growth support media having active biological material thereon within the submerged fixed bed biofilm reactor;
    contacting the active biological material with the attached growth support media to generate a film of active biological material on a surface of the attached growth support media;
    contacting the wastewater stream with the attached growth support media and the activated carbon within the submerged fixed bed biofilm reactor to reduce an amount of biodegradable and adsorbable contaminants in the wastewater stream, wherein a ratio of activated carbon to biological material is from 0.5:1 to 25:1 by weight;
    delivering an effluent from the submerged fixed bed biofilm reactor to a liquid/solid separator for separating the effluent into a liquid portion and a solids portion, wherein the solids portion comprises an amount of spent carbon and biological material; and
    regenerating the spent carbon and delivering the regenerated spent carbon to the submerged fixed bed biofilm reactor or the wastewater stream.

7. A treatment system comprising:
    a source of the wastewater stream comprising a wastewater stream comprising an amount of biodegradable and adsorbable contaminants;
    a submerged fixed bed biofilm reactor in fluid communication with the source, the submerged fixed bed biofilm reactor comprising an amount of activated carbon and an attached growth support media having active biological material thereon, wherein a ratio of activated carbon to biological material is from 0.5:1 to 25:1 by weight; and
    a liquid/solid separator disposed downstream of the submerged fixed bed biofilm reactor for separating an effluent from the submerged fixed bed biofilm reactor into a liquid portion and a solids portion.

8. The system of claim 7, further comprising a source of activated carbon in fluid communication with a fluid line between the wastewater source and the submerged fixed bed biofilm reactor.

9. The system of claim 7, wherein the liquid/solid separator comprises a membrane unit comprising a plurality of membranes and an amount of powdered activated carbon therein.

10. The system of claim 7, further comprising a wet air oxidation unit in fluid communication with the membrane unit.

* * * * *